United States Patent
Jeon

(10) Patent No.: US 6,925,863 B2
(45) Date of Patent: Aug. 9, 2005

(54) METHOD AND APPARATUS FOR LEARNING AN INITIAL VALUE OF HYDRAULIC PRESSURE FOR UPSHIFT CONTROL OF AN AUTOMATIC TRANSMISSION

(75) Inventor: Byeong Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 10/747,886

(22) Filed: Dec. 29, 2003

(65) Prior Publication Data

US 2005/0092073 A1 May 5, 2005

(30) Foreign Application Priority Data

Oct. 30, 2003 (KR) ........................ 10-2003-0076459

(51) Int. Cl.[7] .......................................... G01M 13/02
(52) U.S. Cl. ................................................... 73/118.1
(58) Field of Search ................. 73/112, 116, 117.2, 73/117.3, 118.1, 119 R; 701/29, 51, 64, 66; 475/254; 476/12

(56) References Cited

U.S. PATENT DOCUMENTS

| | | | | |
|---|---|---|---|---|
| 5,608,626 A | * | 3/1997 | Ibamoto et al. | 701/51 |
| 5,806,009 A | * | 9/1998 | Horiguchi | 701/58 |
| 5,842,950 A | * | 12/1998 | Tsutsui et al. | 477/143 |
| 6,575,047 B2 | * | 6/2003 | Reik et al. | 73/862.191 |
| 2004/0192484 A1 | * | 9/2004 | Watanabe et al. | 475/116 |
| 2004/0249540 A1 | * | 12/2004 | Saitou et al. | 701/51 |

FOREIGN PATENT DOCUMENTS

| | | |
|---|---|---|
| DE | 19741182 | 4/1998 |
| DE | 10260340 | 2/2004 |
| JP | 05-248530 | 9/1993 |
| JP | 05-296333 | 11/1993 |

\* cited by examiner

Primary Examiner—Eric S. McCall
(74) Attorney, Agent, or Firm—Morgan Lewis & Bockius LLP

(57) ABSTRACT

When a delay period (torque phase period) from a shift start point to a shift begin point of an automatic transmission becomes excessively long, an initial value of hydraulic pressure is forcibly learned such that the torque phase period remains at an appropriate level in accordance with a running state of a vehicle.

17 Claims, 5 Drawing Sheets

METHOD AND APPARATUS FOR LEARNING AN INITIAL VALUE OF HYDRAULIC PRESSURE FOR UPSHIFT CONTROL OF AN AUTOMATIC TRANSMISSION

CROSS-REFERENCE TO RELATED APPLICATIONS

This application claims priority of Korean Application No. 10-2003-0076459, filed on Oct. 30, 2003, the disclosure of which is incorporated fully herein by reference.

FIELD OF THE INVENTION

The present invention relates to an automatic transmission. More particularly, the present invention relates to a method and apparatus for learning an initial value of hydraulic pressure for upshift control of an automatic transmission.

BACKGROUND OF THE INVENTION

A typical automatic transmission (AT) includes a torque converter and a powertrain of a multiple speed gear mechanism connected to the torque converter. In addition, a hydraulic control system may be provided with the AT for selectively operating at least one operational element included in the powertrain, according to a running state of a vehicle.

When it is determined that an upshift is required on the basis of a vehicle speed and throttle valve opening, a transmission control unit (TCU) for controlling an AT starts upshift control by starting control of a solenoid valve in the AT, which is usually called "Shift Start point" and is abbreviated as "SS point".

By starting of the solenoid valve control, after a certain period, an off-going frictional element begins releasing its hydraulic pressure, and an on-coming element begins to be supplied with a hydraulic pressure, which is usually called "Shift Begin point" and is abbreviated as "SB point". The period after the SS point to the SB point becomes a delay period which is not used for an actual shifting operation of the AT.

So, an actual shifting period (also called an inertia phase) of the AT begins at the SB point and finishes at a time point at which the off-going element is fully disengaged and the on-coming element is fully engaged. Such a time point at which the off-going element is fully disengaged and the on-coming element is fully engaged is usually called "Shift Finish point" and is abbreviated as "SF point".

Sometimes, the above mentioned delay period between the SS and SB points is described as a sum of a preparation phase and a torque phase. However, in the specification and the appended claims, such a delay period from the SS point to SB point is integrally referred to simply as a torque phase period.

If the above-mentioned delay period (i.e., a torque phase period) is lengthened, an actual shifting period (i.e., an inertia phase period) may be shortened such that a shift shock results.

Usually the delay period is learned while undergoing a shifting operation of the AT such that a subsequent upshift may be controlled based on the learned delay period. According to the prior art, the learning of such a delay period is not optimized with respect to a running state of an engine, such as with respect to engine torque.

For example, when an engine is run with a high output torque, the torque phase should be lengthened for sufficient shift quality. However, since the torque phase period that is learned may not be as sufficiently long as required, shift quality is deteriorated or a shift shock results.

On the other hand, when an engine is run with a low output torque, the torque phase should be shortened for a rapid response. However, since the torque phase period that is learned may not be as sufficiently short as required, a total period for an upshift may be lengthened more than necessary.

In other words, optimizing the delay period with respect to an engine torque may promise a reduction of shift shock in the case that an engine is run with a high output torque, and reduction of a period consumed for an upshift in the case that the engine is run with a low torque.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention relates to a method for learning an initial value of hydraulic pressure for upshift control of an automatic transmission that may be directed toward optimizing a torque phase period with respect to an engine torque. In an exemplary method for learning an initial value of hydraulic pressure for upshift control of an automatic transmission of a vehicle having an engine connected to the automatic transmission, the method may comprise calculating a turbine torque of the automatic transmission, starting upshift control of the automatic transmission, detecting a shift begin point of the automatic transmission, and calculating a torque phase period. The method may further comprise, for example, determining whether the torque phase period is greater than a predetermined time limit, and calculating a forced adjusting value when the torque phase period is greater than the predetermined time limit. The method may also comprise learning the initial value of hydraulic pressure based on the forced adjusting value.

In one embodiment, the predetermined time limit may be preset as a function of the turbine torque and a vehicle speed of the vehicle. The predetermined time limit may be designed to increase as the turbine torque increases. The predetermined time limit may also be designed to increase as the vehicle speed increases.

In an exemplary embodiment, the forced adjusting value may be calculated as a predetermined ratio of a current learned value of the initial value of hydraulic pressure when the torque phase period is greater than the predetermined time limit by more than a predetermined deviation.

The exemplary method for learning an initial value of hydraulic pressure for upshift control of an automatic transmission of a vehicle may also comprise adding the forced adjusting value to a current learned value of the initial value of hydraulic pressure and the forced adjusting value. The exemplary method may also comprise storing the initial value of hydraulic pressure such that the initial value of hydraulic pressure may be retrieved for subsequent upshift control of the automatic transmission. An exemplary method for learning an initial value of hydraulic pressure for upshift control of an automatic transmission of a vehicle may further comprise retrieving the initial value of hydraulic pressure for subsequent upshift control of the automatic transmission. The exemplary method may also comprise maintaining a torque phase period at an appropriate level in accordance with a running state of a vehicle. In one example, maintaining a torque phase period at an appropriate level in accordance with a running state of a vehicle may comprise reducing the torque phase period.

The present invention also relates to an apparatus for learning an initial value of hydraulic pressure for upshift control of an automatic transmission that may be directed toward optimizing a torque phase period with respect to an engine torque. An exemplary apparatus for learning an initial value of hydraulic pressure for upshift control of an automatic transmission of a vehicle having an engine connected to the automatic transmission may comprise a throttle opening detector for detecting a throttle valve opening of the engine, and a vehicle speed detector for detecting a vehicle speed of the vehicle. The exemplary apparatus may also comprise a turbine speed detector for detecting a turbine speed of the automatic transmission, and a transmission control unit for controlling the automatic transmission in response to signals from the throttle opening detector and the turbine speed detector. The transmission control unit may execute a program comprising instructions for calculating a turbine torque of the automatic transmission, starting upshift control of the automatic transmission, detecting a shift begin point of the automatic transmission, calculating a torque phase period, and determining whether the torque phase period is greater than a predetermined time limit. The program may also comprise instructions for calculating a forced adjusting value when the torque phase period is greater than the predetermined time limit, and learning the initial value of hydraulic pressure based on the forced adjusting value. For instance, the predetermined time limit may be preset as a function of the turbine torque and the vehicle speed. In one non-limiting example, the predetermined time limit may be designed to increase as the turbine torque increases. In another non-limiting example, the predetermined time limit may be designed to increase as the vehicle speed increases.

The transmission control unit may also execute a program comprising instructions wherein the forced adjusting value is calculated as a predetermined ratio of a current learned value of the initial value of hydraulic pressure when the torque phase period is greater than the predetermined time limit by more than a predetermined deviation. The transmission control unit may also execute a program comprising instructions wherein learning the initial hydraulic pressure adds the forced adjusting value to a current learned value of the initial hydraulic pressure and the forced adjusting value. In one non-limiting example, the transmission control unit may execute a program comprising instructions for learning the initial hydraulic pressure by adding the forced adjusting value to a current learned value of the initial hydraulic pressure and the forced adjusting value.

BRIEF DESCRIPTION OF THE DRAWINGS

The accompanying drawings, which are incorporated in and constitute a part of the specification, illustrate an embodiment of the invention, and, together with the description, serve to explain principles of the invention.

DETAILED DESCRIPTION OF THE PREFERRED EMBODIMENTS

An embodiment of the present invention will hereinafter be described in detail with reference to the accompanying drawings.

Figure 1:
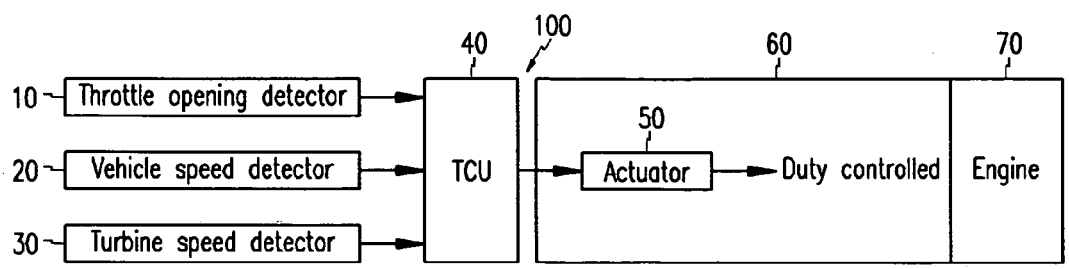
FIG. 1 is a block diagram of an apparatus for learning an initial value of hydraulic pressure for upshift control of an automatic transmission according to an embodiment of the present invention.

As shown in FIG. 1, an apparatus for learning an initial value of hydraulic pressure for upshift control of an automatic transmission (AT) according to an embodiment of the present invention learns an initial hydraulic pressure in upshift control of an AT 60 of a vehicle 100 that has an engine 70 connected to the AT 60.

The apparatus for learning an initial value of hydraulic pressure for upshift control of an automatic transmission according to an embodiment of the present invention includes a throttle opening detector 10 for detecting a throttle valve opening of the engine 70, a vehicle speed detector 20 for detecting a speed of the vehicle 100, a turbine speed detector 30 for detecting a turbine speed of the AT 60, a transmission control unit 40 for controlling the AT 60 on the basis of signals from the detectors 10, 20, and 30, and an actuator 50 for realizing an upshift of the AT 60 under the control of the TCU 40.

The actuator 50 may be realized by one or more solenoid valves for controlling hydraulic pressure supply in the AT 60.

The TCU 40 can be realized by one or more processors activated by a predetermined program, and the predetermined program can be programmed to perform each step of a method according to an embodiment of this invention.

Figure 2:
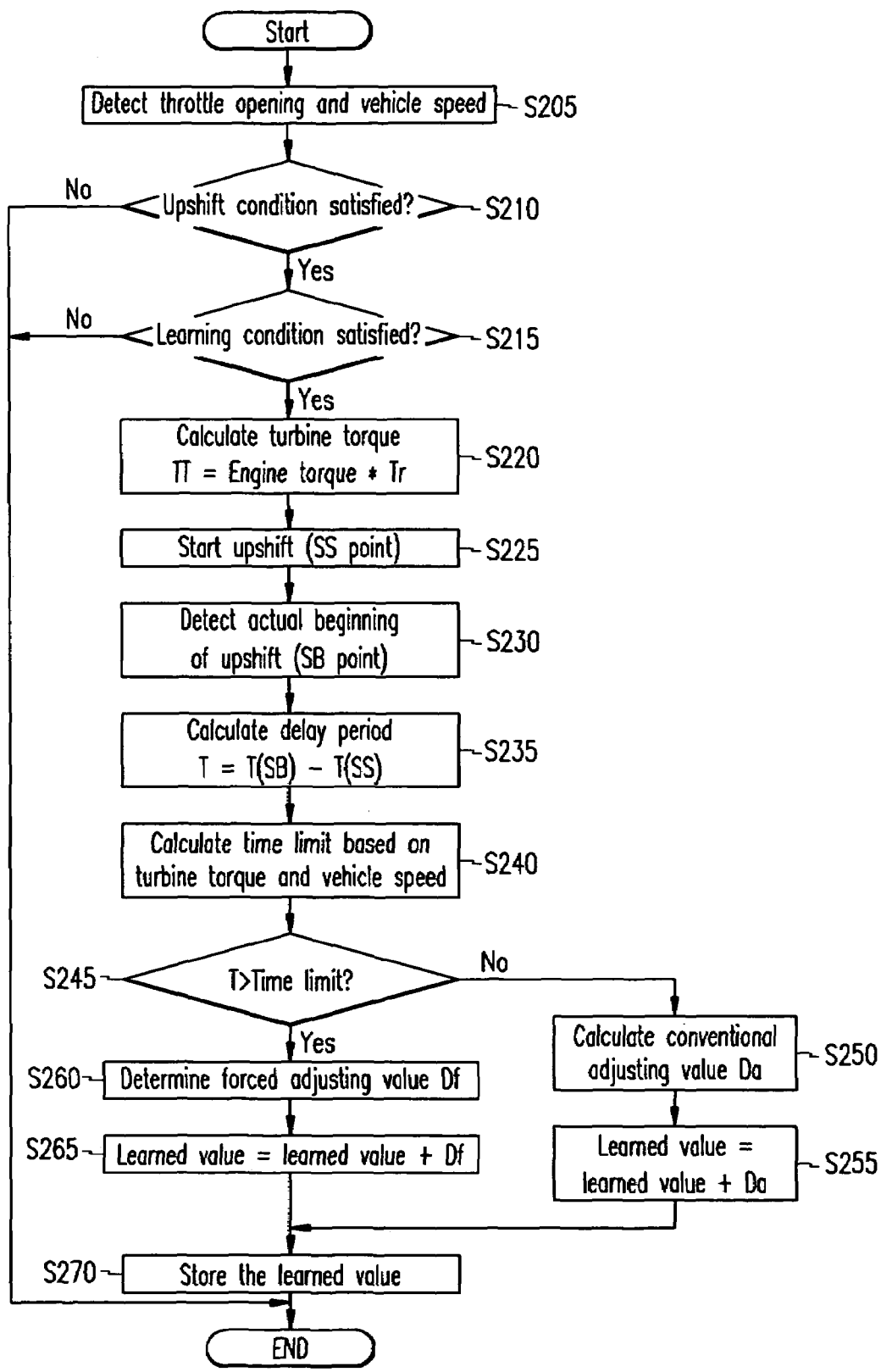
FIG. 2 is a flowchart showing a method for learning an initial value of hydraulic pressure for upshift control of an automatic transmission according to an embodiment of the present invention.

A method for learning an initial value of hydraulic pressure for upshift control of an automatic transmission according to an embodiment of the present invention is hereinafter described in detail with reference to FIG. 2.

Firstly, at step S205, the TCU 40 detects a throttle opening with the throttle opening detector 10, and a vehicle speed with the vehicle speed detector 20. And then at step S210, the TCU 40 determines if an upshift of the automatic transmission 60 is required on the basis of the throttle valve opening and the vehicle speed.

When an upshift is not required at the step S210, a method for learning an initial value of hydraulic pressure for upshift control of an automatic transmission according to an embodiment of the present invention is finished.

When an upshift is required at the step S210, the TCU 40 determines if a current running state of the vehicle 100 satisfies a predetermined learning condition at step S215.

The predetermined learning condition may be obviously set as a preferable one by a person of ordinary skill in the art.

When the current running state of the vehicle 100 does not satisfy the predetermined learning condition at the step S215, the method for learning an initial value of hydraulic pressure for upshift control of an automatic transmission according to an exemplary embodiment of the present invention is finished.

When the current running state of the vehicle 100 satisfies the predetermined learning condition at the step S215, the TCU 40 calculates a turbine torque TT at step S220 by multiplying the engine torque with a torque ratio of a torque converter Tr.

Subsequently at step S225 (SS point), the TCU 40 starts upshift control of the automatic transmission by driving the actuator 50. TCU 40 then detects a shift begin point SB of the AT 60 at step S230. The shift begin point SB may be determined on the basis of e.g., changes of the turbine speed detected by the turbine speed detector 30.

At step S235, the TCU 40 calculates a delay period (i.e., torque phase period) T between the SS point and the SB point as a value obtained by "T=SB−SS".

Subsequently at step S240, the TCU 40 calculates a predetermined time limit on the basis of the vehicle speed and the turbine torque.

Figure 3:
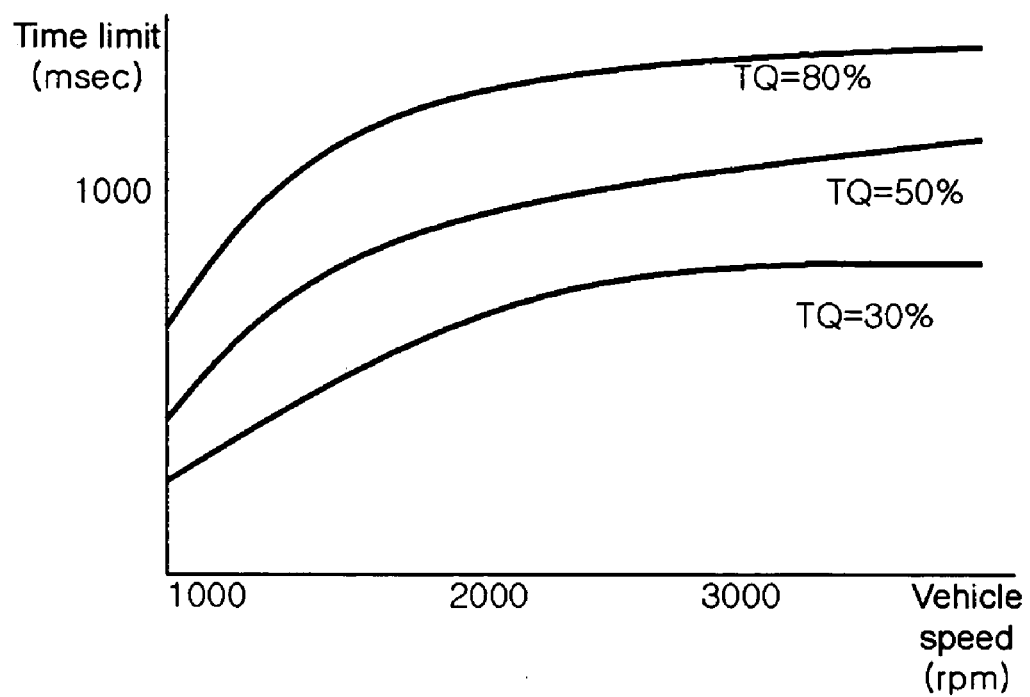
FIG. 3 is an exemplary graph showing a predetermined time limit preset as a function of a turbine torque and a vehicle speed in a method for learning an initial value of hydraulic pressure for upshift control of an automatic transmission according to an embodiment of the present invention.

At step S245, the TCU 40 determines if the torque phase period T is greater than the predetermined time limit. According to an embodiment of the present invention, the predetermined time limit is preset as a function of the turbine torque and a vehicle speed as shown in FIG. 3. In more detail, according to an embodiment of the present invention, the predetermined time limit increases as the turbine torque increases, and increases as the vehicle speed increases.

When the torque phase period T is not greater than the predetermined time limit at the step S245, the TCU 40 calculates a current adjusting value Da of the initial value of hydraulic pressure in a conventional way at step S250.

Subsequently at step S255, the TCU 40 renews or updates a learned value of the initial value of hydraulic pressure by adding a current learned value of the initial value of hydraulic pressure and the current adjusting value Da.

When the torque phase period T is greater than the predetermined time limit at the step S245, the TCU 40 calculates a forced adjusting value Df of the initial value of hydraulic pressure at step S260 for shortening the delay period between the SS point and the SB point.

The forced adjusting value Df may be calculated as a function of an amount by which the torque phase period is greater than the predetermined time limit. For example, in an illustrative embodiment of the present invention, such a function for the forced adjusting value Df may be set as shown in FIG. 4.

Figure 4:
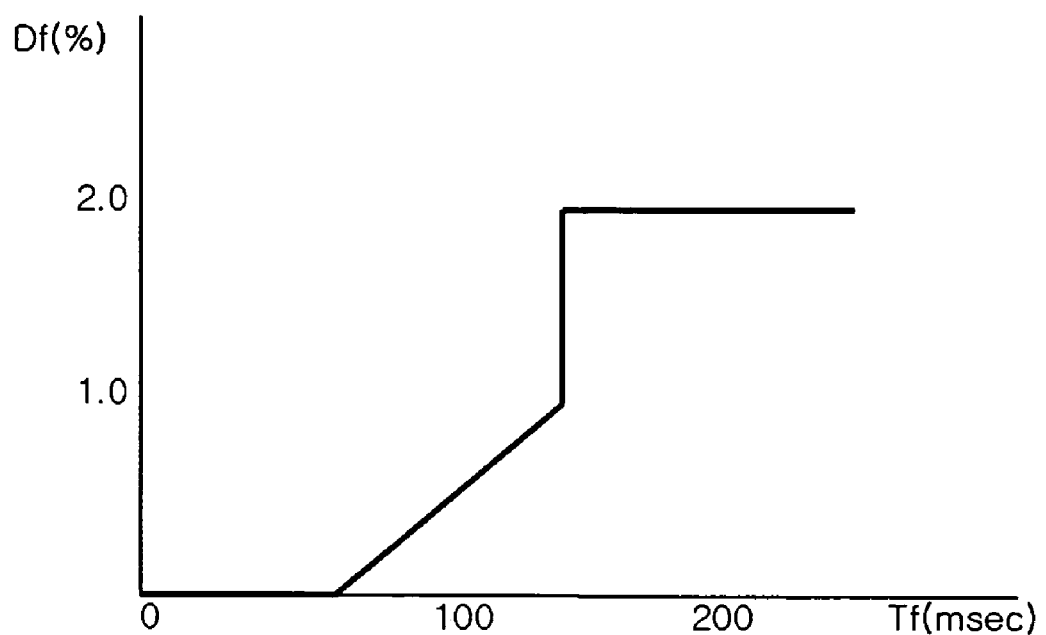
FIG. 4 is an exemplary function for calculating a forced adjusting value in a method for learning an initial value of hydraulic pressure for upshift control of an automatic transmission according to an embodiment of the present invention.

As shown in FIG. 4, when the torque phase period is greater than the predetermined time limit by more than a predetermined deviation (e.g., 150 msec), the forced adjusting value Df is calculated as a predetermined ratio (e.g., 2.0%) of a current learned value of the initial value of hydraulic pressure.

When the forced adjusting value Df is calculated as such, the TCU 40 renews or updates the learned value of the initial value of hydraulic pressure at step S265 by adding the forced adjusting value and a current learned value of the initial value of hydraulic pressure and the forced adjusting value.

Accordingly, the TCU 40 may calculate a final output duty of the actuator as the following equation 1.

$$Du = Du_o + Da_o + Df \quad \text{(Equation 1)}$$

Here, $Du_o$ denotes a base duty obtained by a predetermined base map table, $Da_o$ denotes a current learned value, and Df denotes the forced adjusting value.

When the learned value of the initial value of hydraulic pressure is renewed or updated at either step S255 or S265, the TCU 40 stores the renewed learned value of the initial value of hydraulic pressure at step S270 such that the stored learned value of the initial value of hydraulic pressure may be retrieved and used for a subsequent upshift operation of the AT 70.

Figure 5:
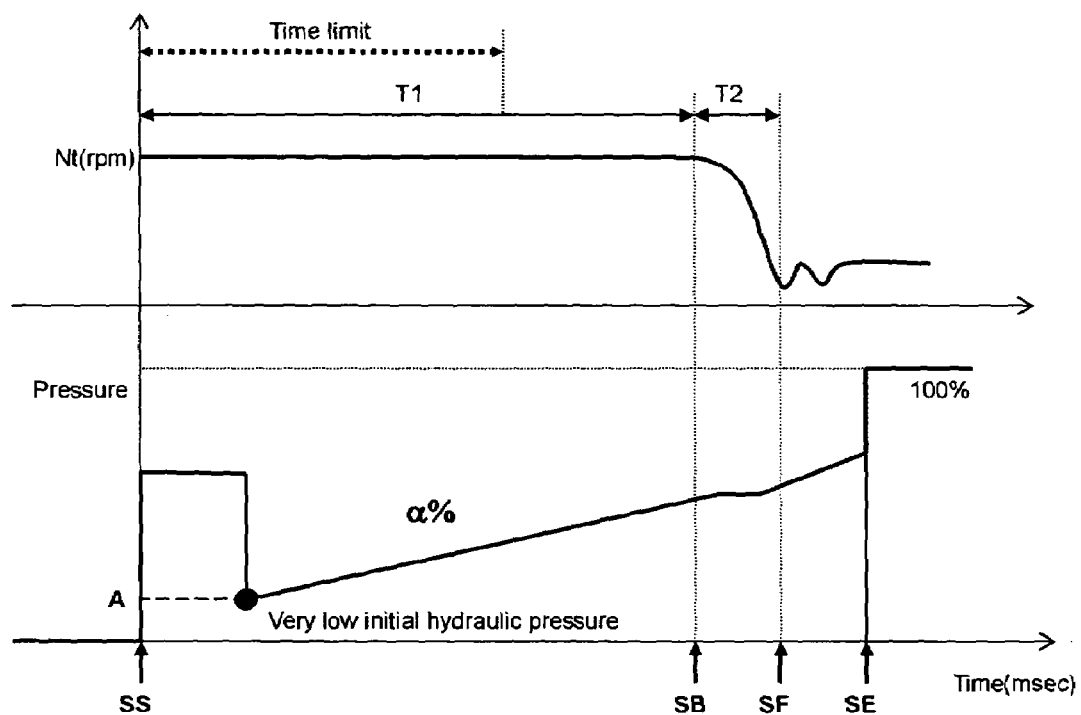
FIG. 5 is an exemplary timing diagram for illustrating a method for learning an initial value of hydraulic pressure of upshift control of an automatic transmission according to an embodiment of the present invention.

FIG. 5 is an exemplary timing diagram for illustrating a method for learning an initial value of hydraulic pressure for upshift control of an automatic transmission according to an embodiment of the present invention.

As shown in FIG. 5, when an initial value of hydraulic pressure is very low (point A) in an upshift such that a torque phase period T1 from the SS point to the SB point exceeds a predetermined time limit, instead of a conventional learning of the initial value of hydraulic pressure, the TCU 40 forcibly increases an initial value of hydraulic pressure by a forced adjusting value α% (which may be calculated as e.g., 1.25%) and thereby reduces a torque phase period.

As described above, according to an embodiment of the present invention, when a delay period from an SS point to an SB point in an upshift is excessively long, the delay period may be forcibly reduced, so an excessively long delay period may be prevented.

In addition, whether the delay period is excessively long is determined based on a comparison with a predetermined time limit depending on a turbine torque and a vehicle speed, so a torque phase period may be maintained at an appropriate level in accordance with a running state of a vehicle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for learning an initial value of hydraulic pressure for upshift control of an automatic transmission of a vehicle having an engine connected to the automatic transmission, the method comprising:
    calculating a turbine torque of the automatic transmission;
    starting upshift control of the automatic transmission;
    detecting a shift begin point of the automatic transmission;
    calculating a torque phase period;
    determining whether the torque phase period is greater than a predetermined time limit;
    calculating a forced adjusting value when the torque phase period is greater than the predetermined time limit; and
    learning the initial value of hydraulic pressure based on the forced adjusting value.

2. The method of claim 1, wherein the predetermined time limit is preset as a function of the turbine torque and a vehicle speed of the vehicle.

3. The method of claim 2, wherein the predetermined time limit increases as the turbine torque increases.

4. The method of claim 2, wherein the predetermined time limit increases as the vehicle speed increases.

5. The method of claim 1, wherein the forced adjusting value is calculated as a predetermined ratio of a current learned value of the initial value of hydraulic pressure when the torque phase period is greater than the predetermined time limit by more than a predetermined deviation.

6. The method of claim 1, wherein learning the initial value of hydraulic pressure comprises adding the forced adjusting value to a current learned value of the initial value of hydraulic pressure and the forced adjusting value.

7. The method of claim 6, further comprising storing the initial value of hydraulic pressure such that the initial value of hydraulic pressure may be retrieved for subsequent upshift control of the automatic transmission.

8. The method of claim 7, further comprising retrieving the initial value of hydraulic pressure for subsequent upshift control of the automatic transmission.

9. The method of claim 8, further comprising maintaining a torque phase period at an appropriate level in accordance with a running state of a vehicle.

10. The method of claim 9, further comprising reducing the torque phase period.

11. An apparatus for learning an initial value of hydraulic pressure for upshift control of an automatic transmission of a vehicle having an engine connected to the automatic transmission, the apparatus comprising:
    a throttle opening detector for detecting a throttle valve opening of the engine;
    a vehicle speed detector for detecting a vehicle speed of the vehicle;
    a turbine speed detector for detecting a turbine speed of the automatic transmission; and
    a transmission control unit for controlling the automatic transmission in response to signals from the throttle opening detector and the turbine speed detector;
    wherein the transmission control unit executes a program comprising instructions for:
        calculating a turbine torque of the automatic transmission;
        starting upshift control of the automatic transmission;
        detecting a shift begin point of the automatic transmission;
        calculating a torque phase period;
        determining whether the torque phase period is greater than a predetermined time limit;
        calculating a forced adjusting value when the torque phase period is greater than the predetermined time limit; and
        learning the initial value of hydraulic pressure based on the forced adjusting value.

12. The apparatus of claim 11, wherein the predetermined time limit is preset as a function of the turbine torque and the vehicle speed.

13. The apparatus of claim 12, wherein the predetermined time limit increases as the turbine torque increases.

14. The apparatus of claim 12, wherein the predetermined time limit increases as the vehicle speed increases.

15. The apparatus of claim 11, wherein the forced adjusting value is calculated as a predetermined ratio of a current learned value of the initial value of hydraulic pressure when the torque phase period is greater than the predetermined time limit by more than a predetermined deviation.

16. The apparatus of claim 11, wherein the learning the initial hydraulic pressure adds the forced adjusting value to a current learned value of the initial hydraulic pressure and the forced adjusting value.

17. The apparatus of claim 16, wherein the learning the initial hydraulic pressure adds the forced adjusting value to a current learned value of the initial hydraulic pressure and the forced adjusting value.

* * * * *